Sept. 20, 1966  J. R. WALDIE  3,273,911
TRAILER STABILIZING DEVICE
Filed Oct. 7, 1964  2 Sheets-Sheet 1
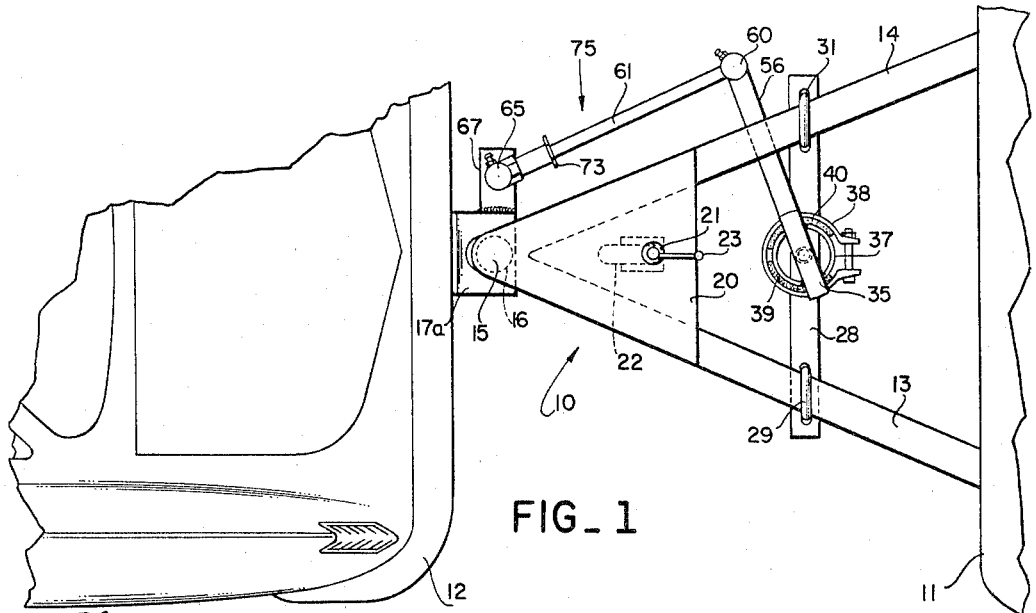
FIG_1
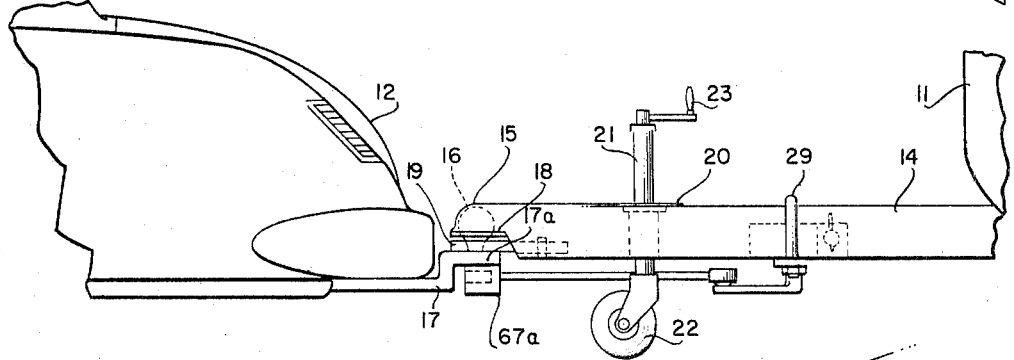
FIG_2
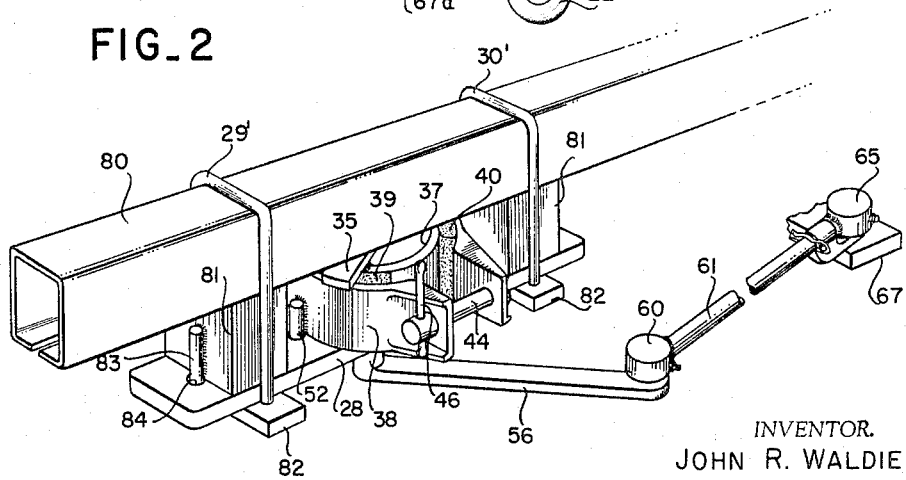
FIG_6
INVENTOR.
JOHN R. WALDIE
BY R. E. Geangue
Attorney Sept. 20, 1966  J. R. WALDIE  3,273,911
TRAILER STABILIZING DEVICE
Filed Oct. 7, 1964  2 Sheets-Sheet 2
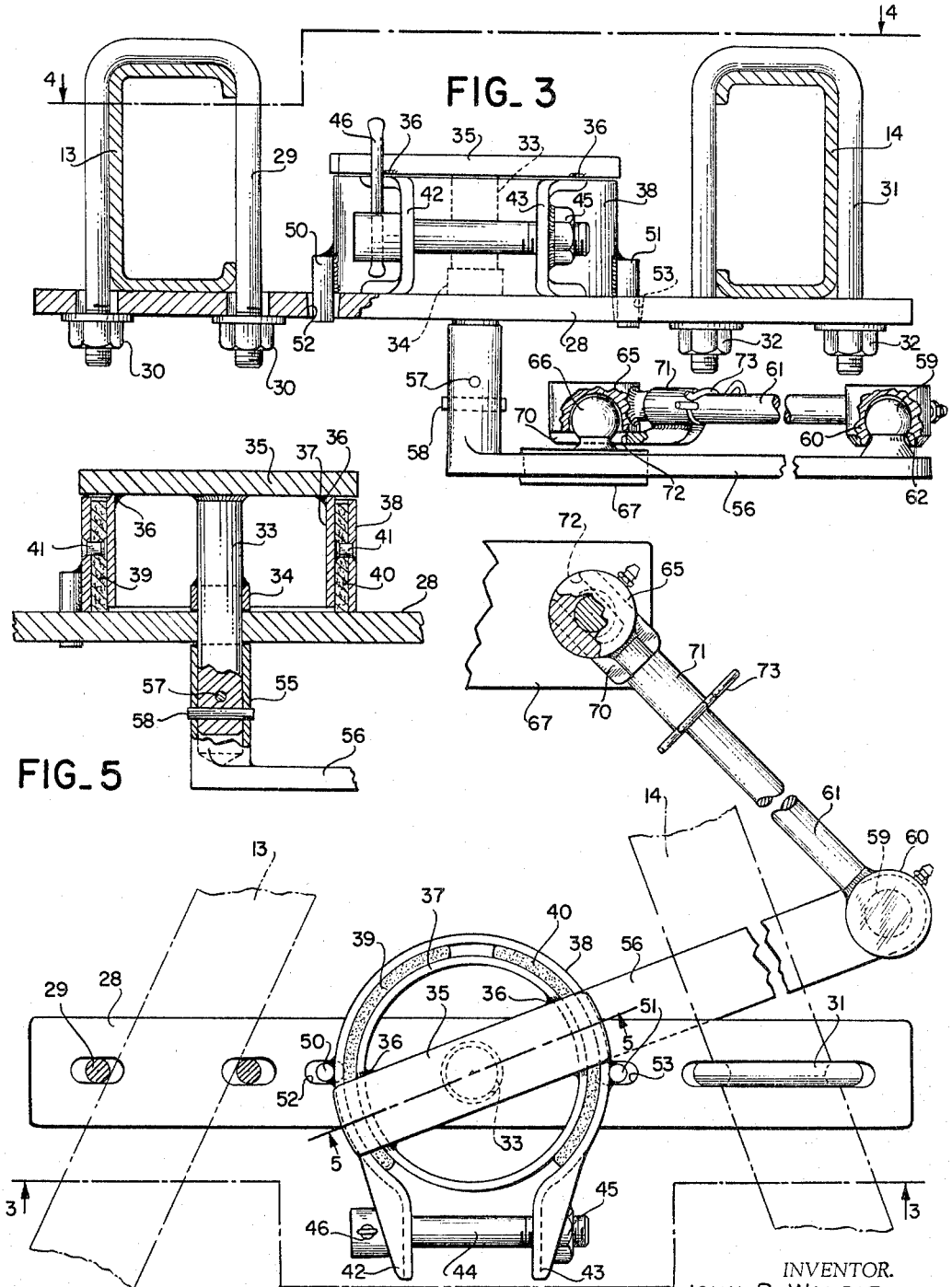
INVENTOR.
JOHN R. WALDIE
BY R. E. Geangue
Attorney United States Patent Office 3,273,911
Patented Sept. 20, 1966

3,273,911
TRAILER STABILIZING DEVICE
John R. Waldie, 7866 Claybeck, Sun Valley, Calif.
Filed Oct. 7, 1964, Ser. No. 402,249
8 Claims. (Cl. 280—446)

This invention relates to a trailer stabilizing device and more particularly to a device for preventing swaying movement of the trailer with respect to its towing vehicle.

When a trailer is being towed by a vehicle, the effect of high wind on the trailer can cause the trailer to sway and become non-aligned with the towing vehicle thereby making it very difficult for the driver to control the vehicle. For instance, sway of the trailer in one direction can cause the trailer to run off the highway and sway in the other direction can cause the trailer to move into the oncoming traffic lane. When the sway is pronounced enough, the trailer can take charge of the vehicle and deflect the vehicle regardless of the skill of the driver. Also, when the trailer moves over rough or hilly terrain, there are forces encountered which can cause the trailer to become non-aligned with the towing vehicle. Braking devices have been proposed in an attempt to reduce sway but such devices have unnecessarily complicated and have not been capable of producing sufficient braking force.

The present invention provides a brake having a liner operating against a brake band to produce a sway opposing force. The brake is mounted on the trailer and a brake linkage which is connected between the brake and the towing vehicle, actuates the braking force when the trailer tries to sway. While the brake force also opposes deliberate turning of the vehicle with respect to the trailer, such a deliberate turn will overcome the brake force and enable the trailer to track around behind the towing vehicle in the usual manner. The brake linkage includes a link connected to the vehicle and extending laterally from the point of attachment of the trailer to the vehicle so that turning of the trailer about the point of attachment produces a movement of the linkage. Also, the linkage has ball joint connections between the several links so that relative tipping between the trailer and vehicle will not damage the linkage.

It is therefore an object of the present invention to provide a trailer stabilizing device having a brake connected with an actuating linkage extending between the trailer and the towing vehicle.

Another object of the invention is to provide a trailer stabilizing device for preventing trailer sway, in which the trailer carries a brake which is connected to the towing vehicle by an actuating linkage which senses relative movement between the trailer and the vehicle.

Another object of the invention is to provide a trailer stabilizing device for preventing trailer sway, the sway resisting force being produced by a brake lining acting against a brake band.

These and other objects of the invention not specifically set forth above will become readily apparent from the accompanying description and drawings in which:

FIGURE 1 is a top plan view of a trailer hitch with the present invention attached thereto.

FIGURE 2 is a side elevational view of the invention as attached in FIGURE 1.

FIGURE 3 is a vertical section alonge line 3—3 of FIGURE 4 showing the brake and the brake actuating linkage.

FIGURE 4 is a top plan view along line 4—4 of FIGURE 3.

FIGURE 5 is a vertical section along line 5—5 of FIGURE 4 showing the brake lining and brake band.

FIGURE 6 is a perspective view of a modification of the present invention for use with a single tongue trailer.

Referring to the embodiment of the invention chosen for purposes of illustration, hitch 10 between trailer 11 and towing vehicle 12 comprises a pair of frame arms 13 and 14 extending from spaced locations at the front of the trailer frame and connecting together to form a socket 15 which receives ball 16 carried by arm 17 attached to the towing vehicle. A cutaway 18 is placed in the end of each of the arms 13 and 14 to clear the raised portion 17a of arm 17. A locking plate 19 is movably supported by the frame arms and can be moved underneath ball 16 to lock the ball in socket 15 in a well known manner. A plate 20 extends between the top of surfaces of arms 13 and 14 and supports housing 21 for the shaft (not shown) of caster wheel 22. A crank 23 serves to move the shaft vertically to lift the caster wheel away from the ground during travel and to engage the wheel with the ground when the trailer is disconnected from the vehicle 12. The hitch 10 is of standard construction and other hitch structures can be utilized with the invention.

One end of a brake mounting bar 28 is secured against the lower surface of arm 13 by a U-bolt 29, the legs of which pass through openings in bar 28 and are secured by nuts 30. In a similar manner, the other end of bar 28 is secured against the lower surface of arm 14 by a U-bolt 31 having ends passing through the bar and secured by nuts 32. A shaft 33 passes through a center opening in bar 28 and has an upper collar 34 welded thereto. The lower end of collar 34 is located adjacent the upper surface of bar 28 and serves to position the shaft 33. A bar 35 is secured at its center to the upper end of shaft 33 and is welded at two locations 36 to the top edge of a brake band 37 which is in the form of a cylindrical sleeve. The bottom edge of band 37 is spaced slightly from the top surface of bar 28 so that the band can rotate with shaft 33. The ends of bar 35 project over the upper edge of a curved split sleeve 38 which supports brake liner sections 39 and 40 by means of rivets 41. The sleeve 38 has wings 42 and 43 containing openings for bolt 44 and the bolt is threaded to nut 45 by rotation of the bolt with pin 46 which extends through the end of the bolt. The brake liners 39 and 40 are located adjacent the brake band 37 and bolt 44 serves to adjust the engaging force between the liners and the band and thereby adjust the braking action. Two pins 50 and 51 extend from opposite sides of sleeve 38 through elongated openings 52 and 53, respectively, in bar 28. Openings 52 and 53 are slightly wider and somewhat longer than the diameter of pins 50 and 51 to permit movement of the sleeve during adjustment of bolt 44. However, the pins hold sleeve 38 against rotation during rotation of the brake band and the sleeve is held opposite the brake band by the ends of bar 35.

The end of shaft 33 below bar 28 is inserted into a sleeve 55 projecting upwardly from an end of link arm 56. Cross pins 57 and 58 secure the shaft to the sleeve so that the upper end of the sleeve is adjacent the lower surface of bar 28. Arm 56 extends outwardly from shaft 33 and its other end carries a ball 59 which is located in a socket 60 on an end of link 61. A lip 62 can be formed on the socket after insertion of the ball into the socket in order to permanently retain the ball in the socket. The other end of link 61 also carries a socket 65 which receives a ball 66 projecting upwardly from an arm 67 connected with the hitch arm 17. The socket 65 is open at the bottom and the ball 66 is retained within the socket by locking arm 70 which is slidably mounted on link 61 by cylinder 71 and contains slit 72 to receive the neck below ball 66. A pin 73 holds the cylinder 71 and arm 70 in locking position to maintain the ball and socket connection. Arm 67 has an upwardly projecting portion 67a which locates the arm 67 in the plane normally assumed by arm 56 and link 61.

It is apparent that the arm 56, link 61, arm 67, and the imaginary link between ball 16 and shaft 33, form a four side linkage 76 which changes in shape when the trailer becomes non-aligned with the towing vehicle in either direction. Movement of arm 56, relative to bar 28 by arm 67 and link 61, is transmitted to bar 35 by shaft 33 and bar 55 moves the brake band 37 relative to the brake lining. When the trailer rotates upwardly in FIGURE 1 about ball 16, the linkage 75 will move the brake band 37 in a clockwise direction relative to the brake lining and when the trailer rotates downwardly, the linkage 75 moves the band counterclockwise relative to the brake lining. This action results because fixed arm 67 is displaced to one side of ball 16 so that ball 66 moves relative to the trailer during sway or misalignment. The arm 56 projects beyond frame arm 13 and is positioned at an angle to bar 28 when the trailer and vehicle are aligned for straight-away travel. Because of the length of arm 56, considerable torque is developed by the linkage on the brake drum 37 and the vehicle can make a sharp left turn without the link 61 engaging the housing 21 of caster wheel 22. Also, because the linkage is below the frame arms 13 and 14, the vehicle can make a sharp right turn and frame arm 13 will move over the linkage. The downwardly extending arm portion 67a serves to locate the ball joint 65, 66 below the frame arms to provide this linkage clearance during a right turn.

The ball joints 59, 60, and 65, 66 permit the trailer to tilt relative to the vehicle and also to assume a different level than the vehicle whether or not the trailer and vehicle are in straight-away alignment. Thus, the link 61 can tilt into various angular positions depending on the difference in level between the trailer and the vehicle and the link 61 can also twist about its axis when the trailer becomes tilted in one direction or the other. It is apparent that the linkage 75 could be placed on either side of the trailer hitch and that the arm 67 can be directly connected to the vehicle frame rather than to hitch arm 17.

In operation of the trailer stabilizing device, the bolt 44 is tightened down to produce an engaging friction between the brake liners and the brake band. This friction resists swaying of the trailer under the influence of gusts of wind or other sway producing forces. If these forces become too great, movement between the brake band and lining will result but the brake continues to resist the swaying movement. Since sway producing forces are usually spasmodic in duration, sway movement of the trailer is either completely stopped or only very little sway movement results. Of course, if the vehicle is purposely placed into a turn, the brake will permit the tracking of the trailer even though the brake will resist the turn. However, under such conditions the turning force is slowly and constantly applied so that no undesirable effect on the driving of the vehicle results from the presence of the brake.

As illustrated in FIGURE 6, wherein like reference numerals designate like parts, the trailer stabilizing system can be utilized in connection with a trailer having a single tongue 80 for connecting the trailer to the towing vehicle. The arm 67 is attached to the vehicle as in the prior embodiment and connects with arm 56 through link 61. The arm 56 rotates the brake band 37 through the bar 35 and the braking force is adjusted by pin 46. Bar 35 and pins 52 and 53 retain sleeve 38 on the bar 28. However, the brake is located directly underneath the single tongue 80 by means of two U-bolts 29' and 30'. A block 81 is located below tongue 80 within each U-bolt and the bar 28 extends between the U-bolts just below the blocks 81. A cross piece 82 is secured across the end of each U-bolt to hold blocks 81 and bar 28 together and a pin 83 projected from the outside of each block 81 through an opening 84 in bar 28 in order to prevent movement therebetween.

It is therefore apparent that the trailer stabilizing device of the present invention can be mounted on various types of trailer hitches, without interfering with its operation. The construction of the brake actuating linkage will be such as not to interfere with relative movement between trailer and the vehicle and types of brakes can be utilized which do incorporate brake liners. Various other modifications are contemplated by those skilled in the art without departing from the spirit and scope of the invention as hereinafter defined by the appended claims.

What is claimed is:

1. A trailer stabilizing device for preventing swaying motion of a trailer connected to its towing vehicle by a pivot connection comprising:
    a tow arm connected to said vehicle and extending rearwardly thereof;
    tow means extending from the front of said trailer and pivotally connected to said tow arm by said pivot connection;
    a mounting bar rigidly connected to said tow means;
    a shaft rotatably mounted in said bar and extending on opposite sides thereof;
    brake means supported by said mounting bar and comprising a circular brake band rigidly connected to one end of said shaft;
    a split sleeve member surrounding said brake band and carrying a brake lining in engagement with said band;
    means connected to the end of said sleeve member for tightening said sleeve member against said brake band;
    and linkage means for connecting the other end of said shaft with said vehicle to provide a brake force between said band and lining against swaying of said trailer.

2. A trailer stabilizing system as defined in claim 1 wherein said split sleeve member is located on said mounting bar by pins extending from said sleeve member into oversized, elongated openings in said bar; and means for varying the engagement force between said band and said lining; said varying means comprising two wings extending from said sleeve member and a bolt extending therethrough for pulling said wings together.

3. A trailer stabilizing system as defined in claim 2 wherein said brake band is connected to the end of said shaft by a bar having its ends projecting over the edge of said sleeve member to hold said sleeve member adjacent said bar.

4. A trailer stabilizing device as defined in claim 1 wherein said linkage means comprises a first pivot point fixed in location with said respect to said vehicle and laterally displaced from said pivot connection, an arm extending laterally outwardly from said brake means in the same direction as and by a greater amount than the lateral displacement of said first pivot point and having a second pivot point at its outer end, and a link connected between said first and second pivot points.

5. A trailer stabilizing device as defined in claim 1 having means for flexibly mounting said split sleeve member to said mounting bar for permitting tightening of said sleeve member on said brake band while preventing movement of said sleeve member during rotation of said brake band.

6. A trailer stabilizing device for preventing swaying motion of a trailer connected to its towing vehicle by a pivot connection comprising:
    brake means mounted on said trailer;
    brake actuating linkage means connecting between said vehicle and said brake means for applying said brake means against movement of said trailer into non-alignment with said vehicle;

said brake means comprising a brake band and a brake lining, one of which is substantially fixed with respect to said trailer and the other of which is connected to said linkage means;

said linkage means comprising a first pivot point fixed in location with said respect to said vehicle and laterally displaced from said pivot connection; an arm extending laterally outwardly from said brake means in the same direction as and by a greater amount than the lateral displacement of said first pivot point; a second pivot point at the outer end of said arm, and a link connected between said first and second pivot points.

7. A trailer stabilizing device as defined in claim 6 having a caster wheel mounted on said trailer between said pivot connection and said brake means, said second pivot point being normally displaced from said caster wheel during straight-away travel by an amount such that said arm and link will not engage said caster wheel during a sharp turn of the vehicle in a direction opposite to the lateral displacement of said second pivot point.

8. A trailer stabilizing device as defined in claim 6 wherein said arm and said link are located below said pivot connection and said brake means to clear said trailer during a turn in either direction; said first and second pivot points each comprising a ball and socket connection to provide flexibility for said linkage means.

References Cited by the Examiner
UNITED STATES PATENTS

| | | | |
|---|---|---|---|
| 778,668 | 12/1904 | Hudson et al. | 188—83 |
| 1,499,179 | 6/1924 | Mastrangel | 188—130 |

FOREIGN PATENTS

| | | |
|---|---|---|
| 695,898 | 12/1940 | Germany. |

LEO FRIAGLIA, *Primary Examiner.*